United States Patent
Ponnampalam et al.

(10) Patent No.: US 8,428,084 B2
(45) Date of Patent: *Apr. 23, 2013

(54) CELLULAR COMMUNICATION SYSTEM AND METHOD FOR BROADCAST COMMUNICATION

(75) Inventors: Vishakan Ponnampalam, Bristol (GB); Peter Bruce Darwood, Yorkshire (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,795

(22) Filed: Jun. 14, 2011

(65) Prior Publication Data

US 2011/0244876 A1 Oct. 6, 2011

Related U.S. Application Data

(63) Continuation of application No. 11/602,729, filed on Nov. 20, 2006, now Pat. No. 7,986,712.

(30) Foreign Application Priority Data

Nov. 22, 2005 (GB) .................................. 0523710.2

(51) Int. Cl.
*H04J 3/16* (2006.01)
(52) U.S. Cl.
USPC ........... 370/468; 370/337; 370/347; 455/450; 455/452.2
(58) Field of Classification Search .................. 455/403, 455/422.1, 446–447, 450–452.2; 370/294, 370/295, 338, 468
See application file for complete search history.

(56) References Cited

U.S. PATENT DOCUMENTS

| 5,166,926 | A |   | 11/1992 | Cisneros et al. |
| 5,229,995 | A | * | 7/1993  | Strawczynski et al. ........ 370/280 |
| 5,430,716 | A | * | 7/1995  | Pawelski ........................ 370/388 |
| 5,936,949 | A | * | 8/1999  | Pasternak et al. ............. 370/328 |
| 6,016,311 | A |   | 1/2000  | Gilbert et al. |
| 6,131,034 | A |   | 10/2000 | McLaughlin et al. |

(Continued)

FOREIGN PATENT DOCUMENTS

| DE | 19629899 | 8/1997 |
| EP | 0930798  | 7/1999 |

(Continued)

OTHER PUBLICATIONS

Holma, H. et al. eds. (2001). WCDMA for UMTS: Radio Access for Third Generation Mobile Communications. John Wiley & Sons Ltd.: West Sussex, England, 10 pages (Table of Contents).

(Continued)

*Primary Examiner* — Sharad Rampuria

(57) ABSTRACT

A cellular communication system (100) is arranged to support a single cell identifier reuse pattern using a first communication. Management logic (146) comprises broadcast mode logic (150) arranged to support a common cell identifier reuse pattern for broadcast transmissions amongst a cluster of communication cells using a second communication. A plurality of wireless serving communication units are operably coupled to the management logic. At least one wireless communication unit comprises logic arranged to support a unicast communication using a first communication cell identifier and logic arranged to support broadcast communication using a common cell identifier (215) to be used by the wireless communication unit in receiving broadcast communication across the cluster of communication cells.

15 Claims, 5 Drawing Sheets

U.S. PATENT DOCUMENTS

| | | | |
|---|---|---|---|
| 6,330,459 B1 | 12/2001 | Crichton et al. | |
| 6,675,022 B2 * | 1/2004 | Burgan et al. | 455/524 |
| 6,687,498 B2 | 2/2004 | McKenna et al. | |
| 7,024,200 B2 | 4/2006 | McKenna et al. | |
| 7,123,910 B2 | 10/2006 | Lucidarme et al. | |
| 7,986,712 B2 * | 7/2011 | Ponnampalam et al. | 370/468 |
| 2008/0137562 A1 | 6/2008 | Li et al. | |

FOREIGN PATENT DOCUMENTS

| | | |
|---|---|---|
| EP | 1122895 | 8/2001 |
| EP | 1361770 | 11/2003 |
| EP | 1418786 A1 | 5/2004 |
| EP | 1505782 | 2/2005 |
| WO | 2004028041 | 4/2004 |
| WO | 2004039100 | 5/2004 |
| WO | 2005101870 | 10/2005 |

OTHER PUBLICATIONS

Great Britain Search Report for Great Britain Application No. 0523710.2 filed Nov. 22, 2005, 1 page.

International Search Report and Written Opinion mailed Mar. 23, 1007, for PCT Application No. PCT/EP2006/068242 filed Nov. 8, 2006, 13 pages.

Walke, B. H. et al. (2003). "Spectrum Issues and New Air Interfaces," Computer Communications 26:53-63.

Korean Patent Application No. 10-2010-701077; Office Action Dated Dec. 19, 2011 (English Translation).

Korean Patent Application No. 10-2011-7026620; Office Action Dated Dec. 19, 2011 (English Translation).

Korean Patent Application No. 10-2011-7026628; Office Action Dated Dec. 19, 2011 (English Translation).

Korean Patent Application No. 10-2011-7026629; Office Action Dated Dec. 19, 2011 (English Translation).

European Search Report, Applicant: Ipwireless Inc, Application No. 09100191.7-2412, May 9, 2011, 6 pages.

European Search Report, Applicant: IP Wireless, Inc, Application No. 10191273.1-2412, Jan. 27, 2011, 5 pages.

European Search Report, Applicant: IP Wireless, Inc, Application No. 10191274.9-2412, Jan. 27, 2011, 6 pages.

European Search Report, Applicant: IP Wireless, Inc, Application No. 10191275.6-2412, Jan. 27, 2011, 5 pages.

* cited by examiner

CELLULAR COMMUNICATION SYSTEM AND METHOD FOR BROADCAST COMMUNICATION

RELATED APPLICATION(S)

This application is a continuation of U.S. patent application Ser. No. 11/602,729, filed Nov. 20, 2006, which is incorporated by reference in its entirety herein.

This application is related to co-pending and co-owned U.S. patent application Ser. No. 13/159,622, entitled Cellular Communication System And Method For Broadcast Communication and filed on even date herewith, which is incorporated by reference in its entirety herein.

This application is related to co-pending and co-owned U.S. patent application Ser. No. 13/159,747, entitled Cellular Communication System And Method For Broadcast Communication and filed on even date herewith, which is incorporated by reference in its entirety herein.

This application is related to co-pending and co-owned U.S. patent application Ser. No. 13/159,832, entitled Cellular Communication System And Method For Broadcast Communication and filed on even date herewith, which is incorporated by reference in its entirety herein.

FIELD OF THE INVENTION

The invention relates to utilisation of communication resources in cellular communication systems and in particular, but not exclusively, to supporting broadcast communication in a time-division duplex $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In a conventional cellular system, cells in close proximity to each other are allocated non-overlapping transmission resources. For example, in a CDMA network, cells within close proximity to each other are allocated distinct spreading codes (to be used in both the uplink direction and the downlink direction). This may be achieved by, for example, employing the same spreading codes at each cell, but a different cell specific scrambling code. The combination of these leads to effectively distinct spreading codes at each cell.

In order to provide enhanced communication services, the 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth.

Typically, in such cellular systems that employ a single carrier frequency, a wireless subscriber unit is 'connected' to one wireless serving communication unit, i.e. one cell. Other cells in the network typically generate interfering signals to the wireless subscriber unit of interest. Due to the presence of these interfering signals a degradation of the maximum achievable data rate, which can be maintained to the wireless subscriber unit, is typical.

The typical and most cost-effective approach in the provision of multimedia services is to 'broadcast' the multimedia signals, as opposed to send the multimedia signals in an uni-cast (i.e. point-to-point) manner. Typically, tens of channels carrying say, news, movies, sports, etc. may be broadcast simultaneously over a communication network.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions.

Technologies for delivering multimedia broadcast services over cellular systems, such as the Mobile Broadcast and Multicast Service (MBMS) for UMTS, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in the presence of additional, potentially interfering broadcast signals, transmitted on the non-overlapping physical resources of adjacent cells.

In addition, digital video broadcasting (DVB) technologies have recently evolved and are targeted at delivering broadcast video to mobile handheld (DVB-H) terminals. Typically, all wireless infrastructure transmitters in such networks operate as wireless 'repeaters'. Hence, a separate and distinct technology, usually a cellular phone technology, is used to provide uplink and downlink uni-cast signals (which are required to carry control signalling and uplink user traffic) to facilitate broadcast communications to the DVB-H terminal using DVB. Although it is possible to integrate DVB-H receivers for such broadcast systems into a mobile phone, the cost of such 'dual-mode' devices will be significant.

Thus, all known techniques proposed or implemented for broadcast wireless transmissions require either separate spectrum dedicated for broadcast purposes inefficiently. Alternatively, the known techniques propose or implement duplicate circuitry in the mobile receiver to receive distinct broadcast and uni-cast transmissions at respective frequencies, again somewhat inefficiently with respect to broadcast transmissions.

Thus, typically in a cellular network, in order to achieve the high bandwidths envisaged for broadcast transmissions, there is a requirement to mitigate interference from neighbouring cells in order to achieve the high throughput rates required for a broadcast transmission.

EP-A-1361770 discloses a broadcast wireless communication system.

Consequently, current techniques are suboptimal. Hence, an improved mechanism to address the problem of supporting broadcast transmissions over a cellular network would be advantageous. In particular, a system allowing for the provision of broadcast transmissions in an UTRA TDD system to co-exist with the existing UTRA-TDD system would be advantageous.

SUMMARY OF THE INVENTION

Accordingly, the invention seeks to mitigate, alleviate or eliminate one or more of the abovementioned disadvantages singly or in any combination.

According to a first aspect of the invention, there is provided, a cellular communication system. The cellular communication system is arranged to support a single cell identifier reuse pattern using a first communication. Management logic comprises broadcast mode logic arranged to support a common cell identifier reuse pattern for broadcast transmissions amongst a cluster of communication cells using a second communication. A plurality of wireless serving communication units are operably coupled to the management logic. At least one wireless communication unit comprises logic arranged to support a unicast communication using a first communication cell identifier and logic arranged to support broadcast communication using a common cell identifier to be used by the wireless communication unit in receiving broadcast communication across the cluster of communication cells.

In arranging the broadcast mode logic to apply a common cell identifier associated with broadcast transmissions to be used on a plurality of cells and therefore via a plurality of respective wireless serving communication units, one embodiment of the invention avoids handover of communication when a wireless subscriber communication unit receiving only broadcast communications roams from one wireless serving communication unit to another.

The invention may allow improved use of the communication resource in the communication system, for example by more efficient use of the downlink resource to reflect user's needs. The invention may allow improved performance as perceived by the end-users for example by reduced interruption of downlink broadcasts when roaming. The invention may provide increased throughput rates, for example, due to a reduction in handover signalling. The invention may allow improved performance in a cellular network by allowing the wireless subscriber units to receive a stronger desired broadcast signal and a weaker interference signal.

The invention may allow a cellular communication system to dynamically use its resources for either broadcast or uni-cast services as required at any time. The invention may be compatible with some existing communication systems, such as 3GPP TD-CDMA or TD-SCDMA cellular communication systems.

According to an optional feature of the invention, the management logic may be arranged to allocate the common cell identifier to each downlink transmission resource in all clusters of communication cells in the second cellular network, thereby configuring or re-configuring one or more of the plurality of wireless serving communication units to support broadcast communication in the second cellular network. In this manner, the multiple cells transmitting the broadcast signal are 'seen' as a single composite cell at the wireless subscriber communication unit with a greater signal power and reduced interference.

According to an optional feature of the invention, the management logic may comprise mapping logic arranged to map the common cell identifier to at least one scrambling code and at least one pilot sequence to be used in the cluster of communication cells.

According to an optional feature of the invention, the second cellular network may be arranged to employ a carrier intended for time division duplex in broadcast downlink communications. For example, the first carrier frequency and second carrier frequency may be the same carrier frequency, such that the first cellular network may employ a first time portion on the carrier frequency and the second cellular network may employ a second time portion for broadcast downlink communications.

According to a second aspect of the invention, there is provided a wireless communication unit comprising: logic arranged to support a unicast communication using a first communication cell identifier; and logic arranged to support broadcast communication using a common cell identifier reuse pattern for broadcast transmissions across a cluster of broadcast communication cells.

In one optional embodiment, the logic is arranged to support a unicast communication using a first communication cell identifier communicates in a first mode of operation and the logic arranged to support broadcast communication using a common cell identifier reuse pattern communicates in a second mode of operation and is adapted to tolerate a higher multipath delay of received signals than the logic arranged to communicate in the first mode of operation.

According to a third aspect of the invention, there is provided a method of communicating in a cellular communication system. The method comprises, at a wireless communication unit, supporting a unicast communication using a single cell identifier reuse pattern and receiving a broadcast communications using a common cell identifier reuse pattern for broadcast transmissions across a cluster of broadcast communication cells.

In a fourth aspect of the invention, there is provided a non-transitory computer program product having executable program code stored therein for supporting communications in a cellular communication system, the program code operable for, when executed at a wireless communication unit, performing the method of the third aspect.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS (Universal Mobile Telecommunication System) cellular communication system and in particular to a UMTS Terrestrial Radio Access Network (UTRAN) operating in a Time Division Duplex (TDD) mode within a $3^{rd}$ generation partnership project (3GPP) system. However, it will be appreciated that the invention is not limited to this particular cellular communication system, but may be applied to other TDD-based cellular communication systems.

Figure 1:
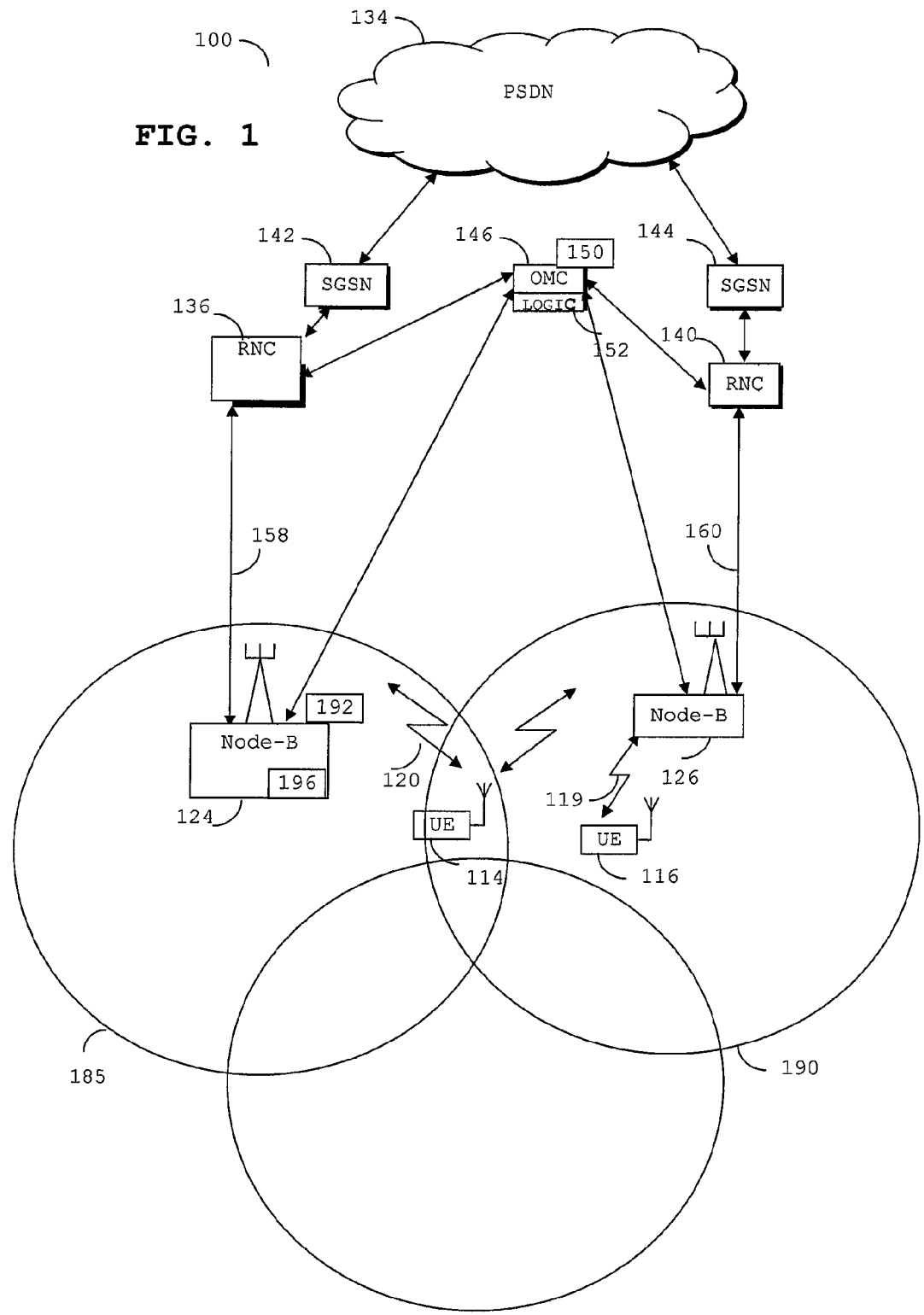
FIG. 1 illustrates a 3GPP cellular communication system adapted in accordance with some embodiments of the present invention.

Referring now to FIG. 1, a cellular-based communication system 100 is shown in outline, in accordance with one embodiment of the present invention. In this embodiment, the cellular-based communication system 100 is compliant with, and contains network elements capable of operating over, an universal mobile telecommunication system (UMTS) air-interface. In particular, the embodiment relates to the Third Generation Partnership Project (3GPP) specification for wide-band code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications).

In particular, the 3GPP system is adapted to support both broadcast and uni-cast UTRA communication from one or more cells.

A plurality of wireless subscriber communication units/ terminals (or user equipment (UE) in UMTS nomenclature) 114, 116 communicate over radio links 119, 120 with a plurality of base transceiver stations, referred to under UMTS terminology as Node-Bs, 124, 126. The system comprises many other UEs and Node-Bs, which for clarity purposes are not shown.

The wireless communication system, sometimes referred to as a Network Operator's Network Domain, is connected to an external network 134, for example the Internet. The Network Operator's Network Domain includes:

(i) A core network, namely at least one Gateway General Packet Radio System (GPRS) Support Node (GGSN) (not shown) and at least one Serving GPRS Support Nodes (SGSN) 142, 144; and (ii) An access network, namely:

(i) A UMTS Radio network controller (RNC) 136, 140; and (ii) A UMTS Node-B 124, 126.

The GGSN (not shown) or SGSN 142, 144 is responsible for UMTS interfacing with a Public network, for example a Public Switched Data Network (PSDN) (such as the Internet) 134 or a Public Switched Telephone Network (PSTN). The SGSN 142, 144 performs a routing and tunnelling function for traffic, whilst a GGSN links to external packet networks.

The Node-Bs 124, 126 are connected to external networks, through Radio Network Controller stations (RNC), including the RNCs 136, 140 and mobile switching centres (MSCs), such as SGSN 144. A cellular communication system will typically have a large number of such infrastructure elements where, for clarity purposes, only a limited number are shown in FIG. 1.

Each Node-B 124, 126 contains one or more transceiver units and communicates with the rest of the cell-based system infrastructure via an $I_{ub}$ interface, as defined in the UMTS specification.

In accordance with one embodiment of the present invention, a first wireless serving communication unit (e.g. Node-B 124) supports TDD operation on a frequency channel comprising a plurality of uplink transmission resources divided into uplink timeslots and a plurality of downlink transmission resources divided into downlink timeslots. Node-B 124 supports communication over geographic area 185.

In accordance with one embodiment of the present invention, a second wireless serving communication unit (i.e. Node-B 126) supports TDD operation on a second frequency channel comprising a plurality of uplink second transmission resources divided into uplink timeslots and a plurality of downlink second transmission resources divided into downlink timeslots. Node-B 126 supports communication over geographic area 190.

Each RNC 136, 140 may control one or more Node-Bs 124, 126. Each SGSN 142, 144 provides a gateway to the external network 134. The Operations and Management Centre (OMC) 146 is operably connected to RNCs 136, 140 and Node-Bs 124, 126. The OMC 146 comprises processing functions (not shown) and logic functionality 152 in order to administer and manage sections of the cellular communication system 100, as is understood by those skilled in the art.

In accordance with one embodiment of the present invention, the OMC 146 (or equivalent Network Element Manager or controller with similar functionality) has been adapted as described below. Hereafter, this 'central' management entity of the wireless communication system will be referred to as 'management logic'. The management logic 146 communicates with one or more RNCs 136, 140, which in turn provide the signalling 158, 160 to the Node-Bs and to the UEs regarding radio bearer setup, i.e. those physical communication resources that are to be used for broadcast and uni-cast transmissions.

In accordance with one embodiment of the invention, the management logic 146 has been adapted to comprise, or be operably coupled to, broadcast mode logic 150. The broadcast mode logic 150 comprises or is operably coupled to signalling logic for signalling to the plurality of wireless subscriber communication units that part or all of the transmission resource in the cellular communication system 100 is to be configured or re-configured for broadcast mode of operation. The broadcast mode of operation is arranged to be in addition to, or as an alternative to, uni-cast transmissions.

In one embodiment of the present invention, a wireless serving communication unit, such as a Node-B, comprises a transmitter that is operably coupled to a processor 196 and a timer 192. Embodiments of the invention utilize the processor 196 and timer 192 to configure or re-configure transmissions from the Node-B 124 in a broadcast mode.

The processor 196 supports downlink broadcast transmissions in addition to, or as an alternative to, uni-cast transmissions in either or both of the downlink and uplink channels of the communication system.

The timer 192 is configured to schedule complete timeslots as broadcast transmissions, under the guidance/instruction of the broadcast mode logic 150. In one embodiment, the broadcast mode logic 150 may schedule special broadcast timeslots in addition to uni-cast transmissions.

The broadcast mode logic 150 is configured to manage the physical resources that are signaled to the RNCs and the Node Bs. In this manner, the broadcast mode logic 150 allocates timeslots for broadcast, sets transit powers and allocates a single cell ID for all timeslots that are to carry broadcast transmissions.

In UTRA TDD, the concept of a single cell identifier is known, whereby a number of identifiers are configured to identify a respective individual cell. In accordance with one embodiment of the invention the 'single cell identifier' is modified and used as a 'common cell' identifier that is applied across multiple cells.

Notably, the cell identifier is a parameter that may be set within the smallest possible time allocated resource unit, for example on a per timeslot basis in a 3GPP TDD scenario. Thus, for broadcast timeslots all cells in the 3GPP TDD network would be signalled using the same identifier; whilst for non-broadcast timeslots a traditional non-overlapping pattern of cell identifiers would be used.

It is envisaged that the broadcast mode logic 150 may also be operably coupled to, or located within, other architecture elements within the network, such as RNC 136, 140 or, say, Node-B 124. It is envisaged that the broadcast mode logic 150 may be distal from the OMC 146 and/or its functionality may be distributed between a number of system elements.

In accordance with one embodiment of the present invention, it is proposed that the broadcast mode logic 150 allocates a data field in the existing UTRA signalling to support combined broadcast and uni-cast transmissions. In this embodiment, as illustrated in the cell diagram 200 of FIG. 2, a common cell-ID 215 is used to signify broadcast transmission in one or a plurality of available timeslots across a number of cells 210 supporting broadcast transmissions.

Currently in UTRA TDD, each Node B is signalled with the cell ID that it is to apply to all of its timeslots. The UEs derive the cell ID as part of their synchronisation procedure (i.e. UEs require the cell ID to decode the transmissions), which is then used to decode all of the timeslots. In the context of the aforementioned broadcast implementation, the cell ID of the timeslot containing the synchronisation burst—usually the beacon timeslot—is derived in the usual manner, i.e. via the synchronisation procedure. However, once the common cell ID has been decoded, the UE will decode the broadcast control channel (BCCH) and extract system information therefrom. Included within the system information is additional signalling (i.e. additional to the current UTRA TDD) that informs the UE of those timeslots that are broadcast, and hence those timeslots to use the common cell ID parameter in order to decode the broadcast transmissions.

Figure 2:
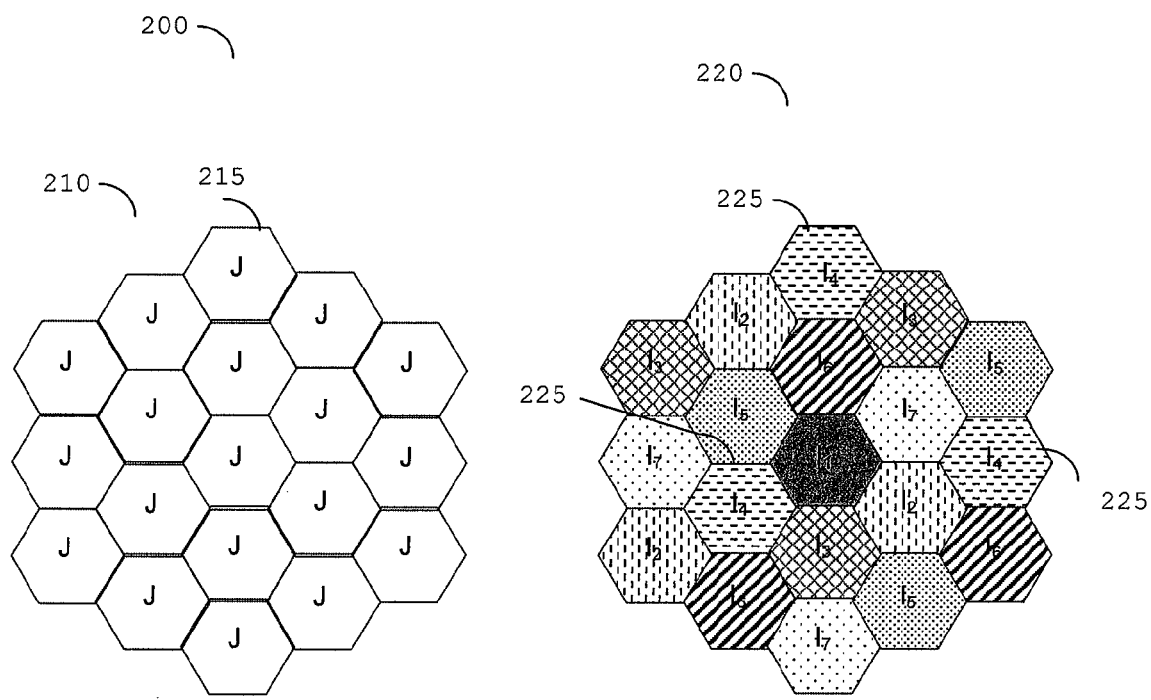
FIG. 2 illustrates cell ID allocation in a UTRA-TDD network for both standard uni-cast transmissions as well as combined broadcast and uni-cast transmissions in accordance with some embodiments of the invention.

FIG. 2 illustrates the broadcast transmissions being performed in all cells, using the common cell-ID 215. However, it is envisaged in another embodiment that clusters of cells may be configured or re-configured to support broadcast transmissions, in contrast to re-configuring all cells. In this manner, the cellular system supports a common cell-ID broadcast network.

It can be further understood that, in some instances, all of the time portion may be dedicated to broadcast transmissions. For example, with reference to the embodiment of UTRA TDD (but not limited to this case), all timeslots may be used to carry broadcast signals, i.e. with this embodiment a common cell ID can be allocated in all of the timeslots. This broadcast mode of operation, using a single cell ID, provides particular advantages where a wireless communication unit is roaming between coverage areas where uni-cast communication was previously supported by alternative Node Bs. In effect, the use of a common cell ID enables the roaming wireless communication unit to avoid a need to perform 'handover' type procedures for reception of broadcast transmissions when roaming from the coverage region of one cell to another.

With respect to one embodiment of the present invention, the ratio of timeslots used for uni-cast and broadcast transmissions may be configured as flexible and can be dynamically altered by the broadcast mode logic 150 located within, or operably coupled to the management logic 146. This may be signalled either in-band, i.e. using one of the UTRA-TDD signalling channels, or out of band, i.e. using some other radio access technology such as GPRS or UTRA-FDD for example. In this case, where system resources are divided between uni-cast and broadcast modes of operation, handover functionality is still required and may be signalled, say, on a common control channel. A common control channel is selected as it is a cell-wide transmission that is intended to provide useful system information to all UEs connected to a particular cell.

Consequently flexible broadcast deployments can be planned where, for instance, the number of broadcast timeslots is changed either on a network by network approach at deployment or based upon some other criteria such as user demand, time of day etc. For instance it may be that more timeslots are used to convey broadcast channels in the evening, whilst during the day it may be that fewer timeslots are required for broadcast and more are required for uni-cast services, such as voice telephony, broadband data applications, etc. Thus, the OMC utilises the system information that can be obtained from various locations within the system or supported by the system (such as scheduling of transmissions), and via various mechanisms, as known to those skilled in the art.

As such the number of timeslots used for broadcast transmissions can be understood to vary from '0' (no broadcast transmissions) to '15' (i.e. the maximum number of timeslots in a radio frame in UTRA TDD). In the latter example, as all available timeslots are used for broadcast transmissions, then any additional signalling required for, say, registration and authentication could be carried on a separate radio access technology (e.g. GPRS or UTRA-FDD, for example) or on the same radio access technology but at a separate carrier frequency or on an alternative TDD carrier. Thus, with all '15' timeslots used for broadcast services the UTRA-TDD carrier could be considered an additional cellular network (or carrier frequency) used in conjunction with an existing cellular network (or carrier frequency) as a dedicated broadcast carrier.

Even in such a dedicated broadcast mode of operation, it is envisaged that certain uni-cast transmissions may still be performed, from time to time, for example to aid with authentication or registration. However, it will be appreciated that these can be performed 'out-of-band', for example using another cellular network access technology, such as GPRS, FDD, etc. Alternatively, it is envisaged that the signalling may be carried out 'in-band' on the same TDD carrier with different allocated timeslots.

With regards to the receiver configuration, it is envisaged that, in the case of 'out-of-band' signalling then the terminal will likely, but not necessarily, be configured as a dual-mode device, i.e. TDD/FDD or TDD/GPRS etc.

Thus, in this aspect of the invention and with reference to UTRA TDD, all of the timeslots within a radio frame are dedicated to broadcast transmissions, whilst any point-to-point transmissions required are carried on another radio access technology.

The common cell-ID 215 in FIG. 2 is used in contrast to the known use of a single cell-ID re-use pattern 220 for uni-cast timeslots 225. Basically, in UTRA TDD there is a one-to-one mapping between the cell ID and the scrambling code, and also between the cell ID and the basic midamble code used. Thus, effectively, the cell ID is a mechanism by which a subscriber unit is able to differentiate between different cells in the network.

If uni-cast and broadcast transmissions are segregated into different timeslots, in an UTRA-TDD network as shown in the left hand side of FIG. 2, then a common cell parameter ID (denoted 'J') may be used across the network for all broadcast timeslots. This is in contrast to a 'conventional' uni-cast single cell parameter ID reuse plan (for example using seven cell parameter IDs denoted $I_1, I_2, \ldots, I_7$) 225, as shown in the second cell configuration 220 of FIG. 2.

In an UTRA TDD network, the cell parameter ID determines the spreading sequences (through control of the cell ID specific scrambling sequence applied to the orthogonal variable spreading factor (OVSF) channelisation codes) and the pilot/midamble sequences used for transmission in a cell. Thus, configuring all cells in the network to use the same cell parameter ID will ensure that the same spreading codes are used throughout the network in broadcast timeslots, and hence exactly the same signals will be transmitted from all cell transmitters in the network.

Furthermore, the use of a common cell ID parameter for all broadcast timeslots in the network ensures that a common set of pilot/midamble sequences, used for channel estimation, are also used in these timeslots. In this manner, provision of a common cell ID allows reception of combined signals from multiple cell transmitters. Hence, a simple receiver architecture, which would typically be employed for detection of signals from a single source only, can be used to receive the same signal from multiple sources. It will be understood that, in this regard, the receiver at the wireless subscriber unit would be designed to cope with the time dispersion associated with receiving multiple identical transmissions from different wireless serving communication units.

Thus, in this embodiment of the invention the cellular network, or carrier of a network, carrying broadcast transmissions is configured as a dedicated broadcast transmission network/carrier. All additional receiver functionality to accommodate uni-cast transmission is performed using another radio access technology or the same radio access technology but on a separate carrier frequency. Thus, in this embodiment, a dual mode device will be used. However, it is envisaged that the device does not necessarily have to have full dual-mode functionality.

Figure 3:
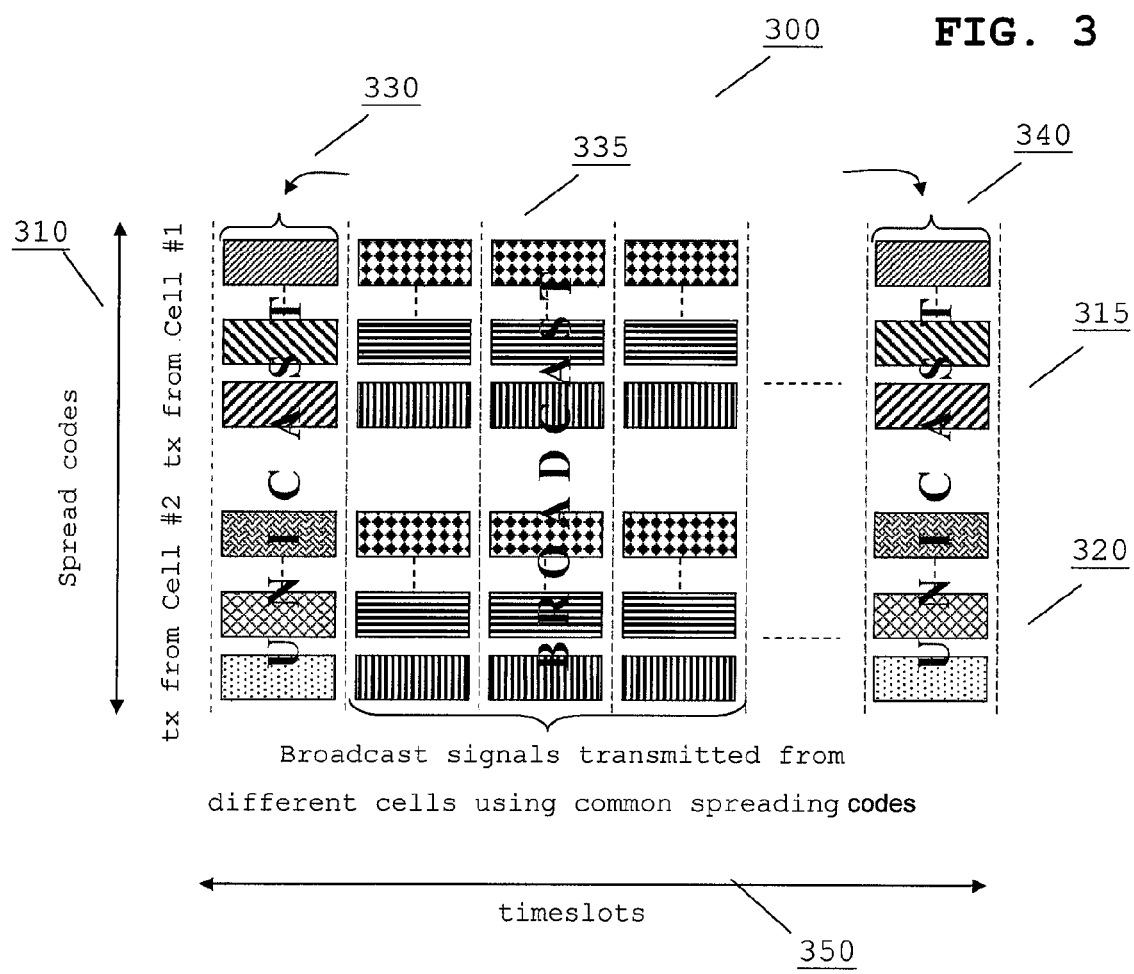
FIG. 3 illustrates a code versus timeslot diagram for a TD-CDMA cellular system, such as UTRA-TDD, in accordance with some embodiments of the invention.

In a further embodiment of the present invention, a partition of the physical resources between uni-cast and broadcast transmissions may be introduced, as illustrated in the conceptual diagram 300 of FIG. 3. In this embodiment of the present invention, the cellular network delivers downlink broadcast services 335 in addition to uni-cast services 330, 340 provided in both uplink and downlink directions.

Notably, whilst uni-cast services 330, 340 are delivered over non-overlapping physical resources in adjacent cells, as in conventional cellular systems, broadcast services 335 are also transmitted simultaneously, i.e. in the same timeslots 350 using identical physical resources in multiple cells. The broadcast services 335 are provided simultaneously by either all cells in the network, or by a cluster of cells in close proximity to one another.

For example, in one embodiment in a TD-CDMA based cellular system, such as UTRA-TDD, the broadcast services are transmitted over the entire network or over a cluster of cells using the same spreading code(s) 310, whilst uni-cast traffic is transmitted using other distinct spreading codes in adjacent cells. In a 3GPP context, the spreading codes may be classified as identical or distinct by their combination with identical or distinct cell scrambling codes (controlled via the common cell ID).

In an enhanced embodiment, it is envisaged that the portion of time used for uni-cast and broadcast transmissions from a network is dynamically controllable by the broadcast mode logic and may vary. Advantageously, the timing of these transmissions will also be signalled to the wireless subscriber communication units. In this manner, the use of broadcast transmissions over the conventional cellular network can be increased or decreased dependent upon the prevailing conditions, such as time of day, number of active users, active user profiles, services being supported, etc.

In yet another embodiment of the present invention, broadcast and uni-cast transmissions may be allocated in different timeslots 350 in UTRA TDD (or 'sub-frames' in proposed long term evolutions to the UTRA standard), as also illustrated in FIG. 3. This reduces the interference experienced by the mobile receiver whilst receiving and detecting broadcast signals. FIG. 3 shows uni-cast services 330, 340 and common broadcast services 335 transmitted from a first UTRA-TDD cell 315 and a second UTRA-TDD cell 320. The first and the last timeslots are used for uni-cast transmissions 330, 340 while broadcast signals 335 are transmitted on the three timeslots in the middle. A number of data bursts, depicted in FIG. 3 by rectangular blocks, are transmitted in each timeslot. In the uni-cast transmission 330, 340, each cell uses a distinct set of spreading codes 310 to transmit multiple bursts within a timeslot. On the other hand, bursts carrying common broadcast signals 335 are transmitted from both cells 315, 320 using identical sets of spreading codes 310. Again, it is envisaged that the aforementioned use of spreading codes can apply to the case where the spreading codes are identical but have been modified by use of the scrambling code, such as the use in a 3GPP context, where the scrambling code may be different per cell.

Figure 4:
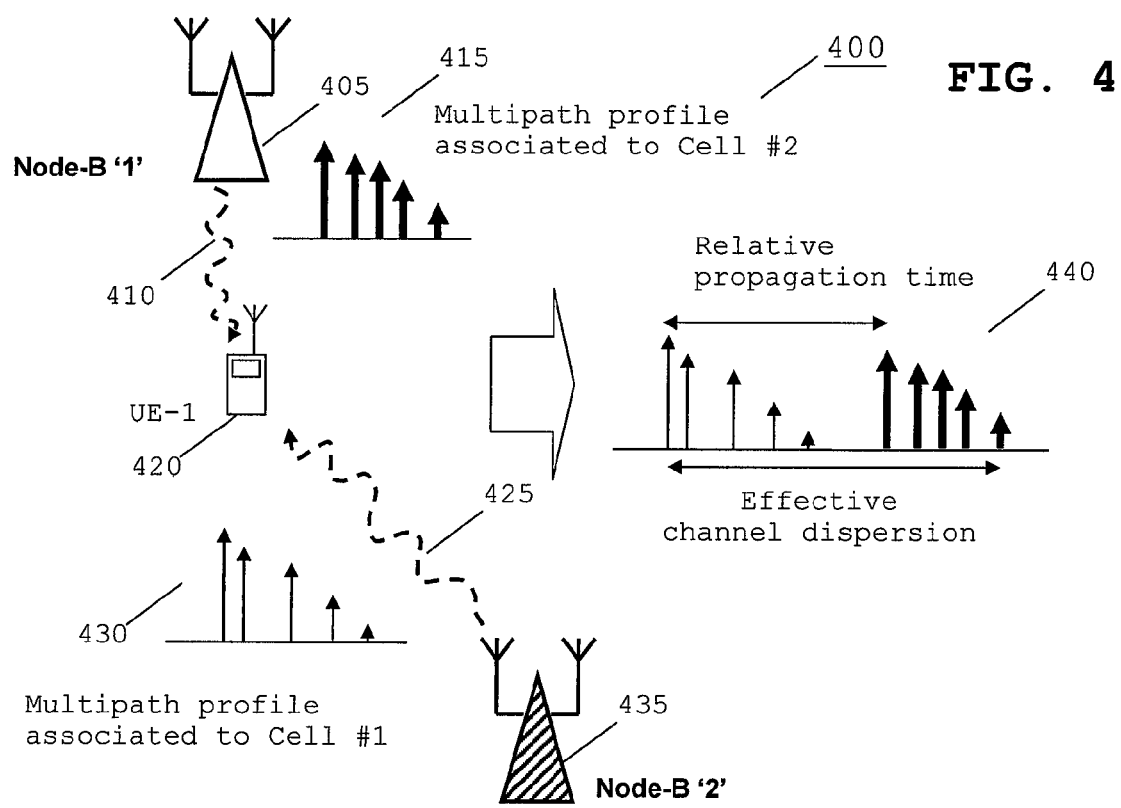
FIG. 4 illustrates equivalent channel profiles associated with broadcast signals from two Node-Bs in accordance with some embodiments of the invention.

From a wireless subscriber communication unit's perspective, receiving broadcast signals 335 transmitted from multiple cells 315, 320 is equivalent to receiving a single higher power signal transmitted from a single cell that has been through a more dispersive channel 415, 430 (due to different propagation delays from neighbouring cells), as shown in FIG. 4.

In the conceptual diagram 400 illustrated in FIG. 4 the wireless subscriber communication unit (mobile terminal) 420 receives broadcast signals from a first Node B 405 operating in a first cell (Cell#1) 315, which is located adjacent to, or neighbouring, a second Node-B 435 operating in a second cell (Cell#2) 320, which is located further away from the wireless subscriber communication unit 420. The channels connecting both Cell#1 and Cell#2 to the wireless subscriber communication unit 420 are temporally dispersive, as indicated by their respective channel impulse responses 415, 430. To the wireless subscriber communication unit, the broadcast signal appears to have been through an effective channel whose impulse response is a combination of the two channel responses 440, separated by the relative propagation time between Cell#1 and Cell#2.

The wireless subscriber communication unit 420 is able to combine broadcast signals transmitted from a plurality of cells by performing a simple detection process, identical to the process used to detect uni-cast signals, as known to those skilled in the art.

A simple detection process is less complex and provides significantly better performance than known explicit signal combining techniques, where different physical resources are transmitted from a number of the plurality of cells. Since, typically, broadcast signals arriving from multiple cells appear to have passed through a more dispersive channel 440 (relative to signals arriving from a single cell 415 or 430) the wireless subscriber communication unit receiver is only needed to be designed such that it is able to tolerate higher multi-path delays.

As a consequence, there is no longer a need for a complex receiver architecture or multiple receivers with signal combining circuitry. Thus, the wireless subscriber communication unit receiver is designed to tolerate a certain multipath delay, whether this is due to temporal dispersion from one transmission or due to multiple transmissions of the same signal from different transmitters.

Advantageously, in accordance with one embodiment of the present invention, a conventional cellular network, which typically transmits different signals from each of the cells, can be configured or re-configured to operate in a broadcast, or pseudo-broadcast, mode of operation. In one embodiment, this is achieved by transmitting simultaneously the same data on the same physical resource (e.g. channelisation codes, scrambling codes, etc. of a UTRA-TDD system), with the same pilot sequence (midambles) from multiple cells.

In this manner, the number and position of, for instance, timeslots that carry broadcast transmissions across the cellular network can be signalled via suitable 'in-band' or 'out-band' signalling procedures. By receiving the signalling, the mobile terminal's receiver is able to configure its receiver architecture according to its requirement for broadcast or uni-cast transmissions, for respective portions of time.

Figure 5:
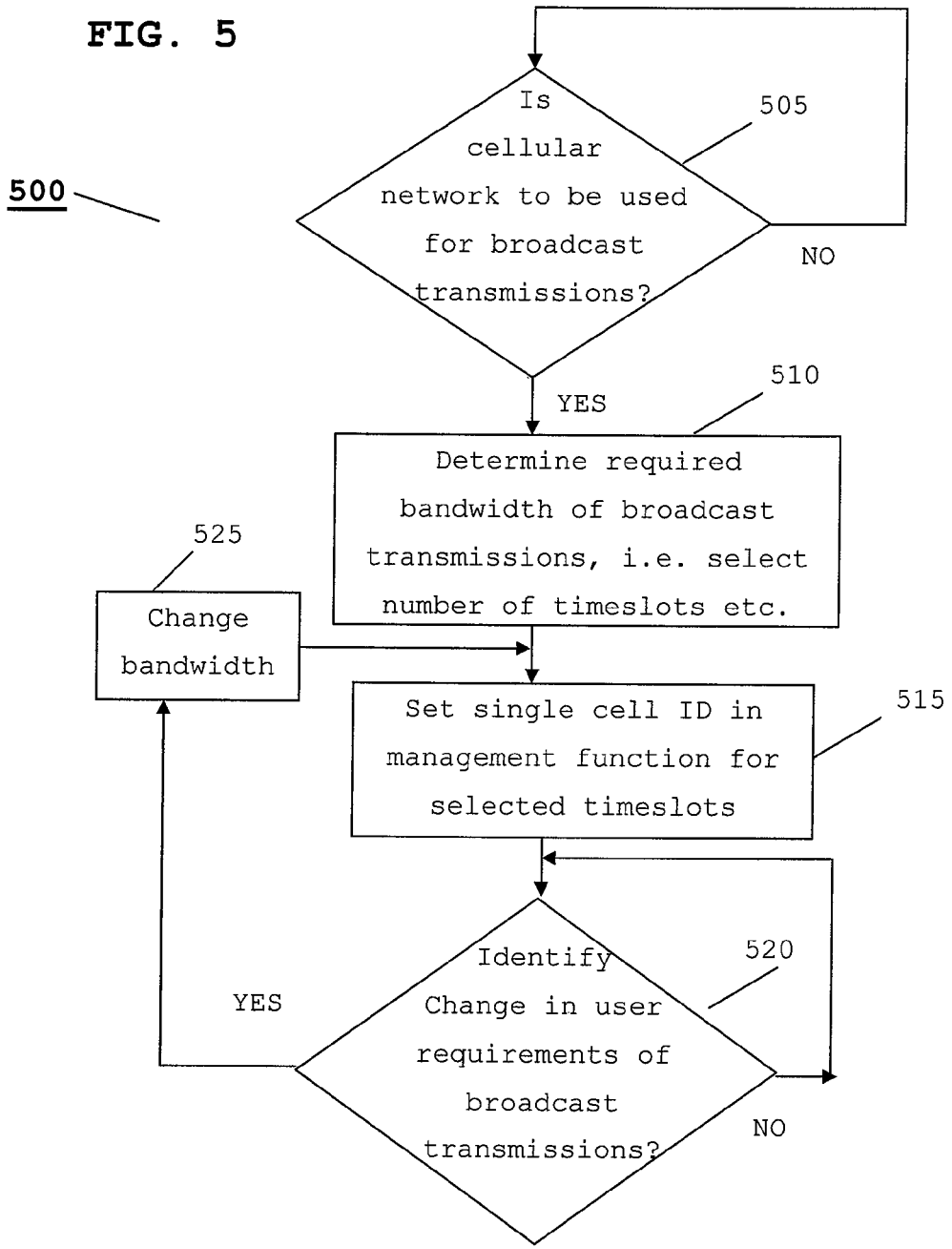
FIG. 5 illustrates a method of employing a combined broadcast and uni-cast operation in a cellular system in accordance with some embodiments of the invention.

Referring now to FIG. 5, a flowchart 500 illustrates a method of operating an uni-cast cellular system to additionally, or alternatively, operate in a broadcast mode of operation. At some point, for example at initial deployment or at a later stage in the use of the network, a decision is made for the network to be used to support broadcast transmissions, as shown in step 505.

If the answer is 'YES', in step 505, then a determination of the required bandwidth of the broadcast transmission is made, as shown in step 510. This determines, amongst other parameters, how many timeslots are required for the broadcast transmission. The broadcast mode logic then sets a common cell ID for the selected timeslots, as shown in step 515. This is signalled to the Radio Network Controller, which in turn signals the information to the Node-Bs and the UEs.

It is also envisaged that the bandwidth of the broadcast transmission can be dynamically adjusted by the network side (e.g. the OMC) as it is a broadcast service. In this manner, more slots may be allocated to broadcast transmissions during peak times or as a result of news events, etc., as in step 525, or following a determination that the broadcast transmission bandwidth is sub-optimal, in step 520. It is envisaged that a change of bandwidth in the system for broadcast transmissions may also result in an alteration of the number of timeslots needed, and hence signalled, for common cell ID use.

It is noteworthy that the above embodiments, which propose use of a common cell ID to identify broadcast transmissions, are not supportable within the present UTRA TDD standard, i.e. the standard requires amending to support the additional signalling required by the above embodiments. Thus, there has been no provision for such a service.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes broadcast mode for UTRA TDD it is envisaged that the inventive concept is not restricted to this embodiment. In particular, for example, future evolutions of UTRA 3GPP (currently referred to as 'long term evolution' (LTE)) will also be divided into timeslots (or other such named time portions), and will therefore be able to benefit from the concepts described hereinbefore.

Delivering broadcast services over cellular networks, in the manner described above, is extremely attractive, for at least one or more of the following reasons:

(i) It provides a self-contained communication system, for example the signalling required (e.g. for encryption key exchange) and uplink data (e.g. to support interactive services) can be carried by the same system that is used to deliver the downlink broadcast service.

(ii) It allows a cellular operator to reuse existing uni-cast infrastructure to provide a dynamic 'broadcast/uni-cast' combination service.

(iii) Improved spectral-efficiency of a cellular communication system can be achieved by delivering a combination of broadcast and uni-cast services.

(iv) It allows a cellular operator to use spectrum that they already own for a new service, thereby facilitating a new revenue stream from their users.

(v) It significantly reduces the cost of the wireless subscriber communication unit if both broadcast and 'conventional' uni-cast services are delivered over the same (or compatible) radio access technologies.

(vi) A wireless subscriber communication unit receiving in timeslots allocated for broadcast transmission sees a much stronger composite broadcast signal sent from several cells, instead of a single cell transmission with several interfering transmissions from other cells (and hence other cell IDs). Thus, the SNR seen in the broadcast timeslots is improved thereby facilitating higher sustainable throughput rates. Thus, the inventive concept provides a more efficient mechanism for delivering broadcast content to the wireless subscriber units.

(vii) A yet further advantage is that one embodiment of the invention uses a radio access technology that is divided into timeslots, such as UTRA TDD or 3GPP LTE. Thus, when configuring or re-configuring the communication system to operate in a broadcast mode or a partial broadcast mode of operation, it is possible to exploit the inherent timeslot nature to provide 'discontinuous' reception, i.e. some timeslots can be used whilst others are not. In this manner, a significant conservation in the battery life of the wireless subscriber communication unit can be achieved, when compared with, say, applying the same principal to a WCDMA network.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

We claim:

1. A cellular communication system (100) arranged to support a single cell identifier reuse pattern using a first communication; the cellular communication system (100) comprising:
    management logic (146) having broadcast mode logic (150) arranged to support a common cell identifier reuse pattern for broadcast transmissions amongst a cluster of communication cells using a second communication;
    a plurality of wireless serving communication units operably coupled to the management logic; and
    at least one wireless communication unit comprising logic arranged to support unicast communication using a first communication cell identifier and logic arranged to support broadcast communication using a common cell identifier (215) to be used by the wireless communication unit in receiving broadcast communication across the cluster of communication cells.

2. The communication system of claim 1 wherein the at least one wireless communication unit is arranged to use the common cell identifier in each downlink transmission resource in all clusters of communication cells to support receiving of the broadcast communication.

3. The communication system of claim 1 wherein the common cell identifier is mapped to at least one scrambling code and at least one pilot sequence to be used in the cluster of communication cells by the at least one wireless communication unit.

4. The communication system of claim 1 wherein the at least one wireless communication unit further comprises a receiver for receiving signalling information that indicates a timing of the unicast communication transmissions and a timing of the broadcast communication.

5. The communication system of claim 1 wherein the broadcast communication is arranged to employ a carrier intended for time division duplex in broadcast downlink communications.

6. The communication system of claim 1 wherein the first communication employs a first carrier frequency and the second communication employs a second carrier frequency to broadcast downlink communications.

7. The communication system of claim 6 wherein the first carrier frequency and second carrier frequency are the same carrier frequency such that the first communication employs a first time portion on the carrier frequency and the second cellular network employs a second time portion for broadcast downlink communications.

8. A wireless communication unit comprising:
    logic arranged to support a unicast communication using a first communication cell identifier; and
    logic arranged to support broadcast communication using a common cell identifier reuse pattern for broadcast transmissions across a cluster of broadcast communication cells.

9. The wireless communication unit of claim 8 wherein the logic arranged to support a unicast communication using a first communication cell identifier communicates in a first mode of operation and the logic arranged to support broadcast communication using a common cell identifier reuse pattern communicates in a second mode of operation and is adapted to tolerate a higher multipath delay of received signals than the logic arranged to communicate in the first mode of operation.

10. The wireless communication unit of claim 8 wherein the wireless communication unit comprises a receiver for receiving signalling information that indicates a timing of the unicast communication transmissions and a timing of the broadcast communication using the common cell identifier reuse pattern.

11. The wireless communication unit of claim 8 wherein the logic arranged to support a unicast communication using a first communication cell identifier and the logic arranged to support broadcast communication using a common cell identifier reuse pattern are dynamically re-configured to support an increase or decrease of the broadcast communication dependent upon at least one prevailing communication condition.

12. The wireless communication unit of claim 11 wherein the at least one prevailing communication condition comprises at least one from a group consisting of: a time of day, a number of active users, active user profiles, services being supported.

13. The wireless communication unit of claim 8 wherein the broadcast communication and the unicast transmissions are allocated different timeslots (350) or different subframes.

14. A method of communicating in a cellular communication system, the method comprising, at a wireless communication unit:
    supporting a unicast communication using a single cell identifier reuse pattern;
    receiving broadcast communication using a common cell identifier reuse pattern for broadcast transmissions across a cluster of broadcast communication cells.

15. A non-transitory computer program product having executable program code stored therein for supporting communications in a cellular communication system, the program code operable for, when executed at a wireless communication unit:
    supporting a unicast communication using a single cell identifier reuse pattern; and receiving broadcast communication using a common cell identifier reuse pattern for broadcast transmissions across a cluster of broadcast communication cells.

* * * * *